Figure 4:
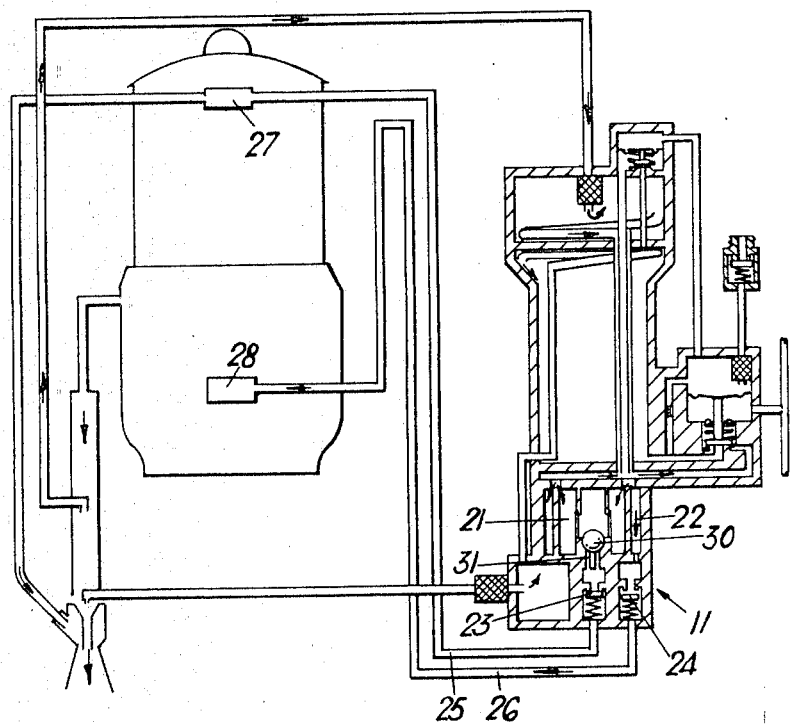

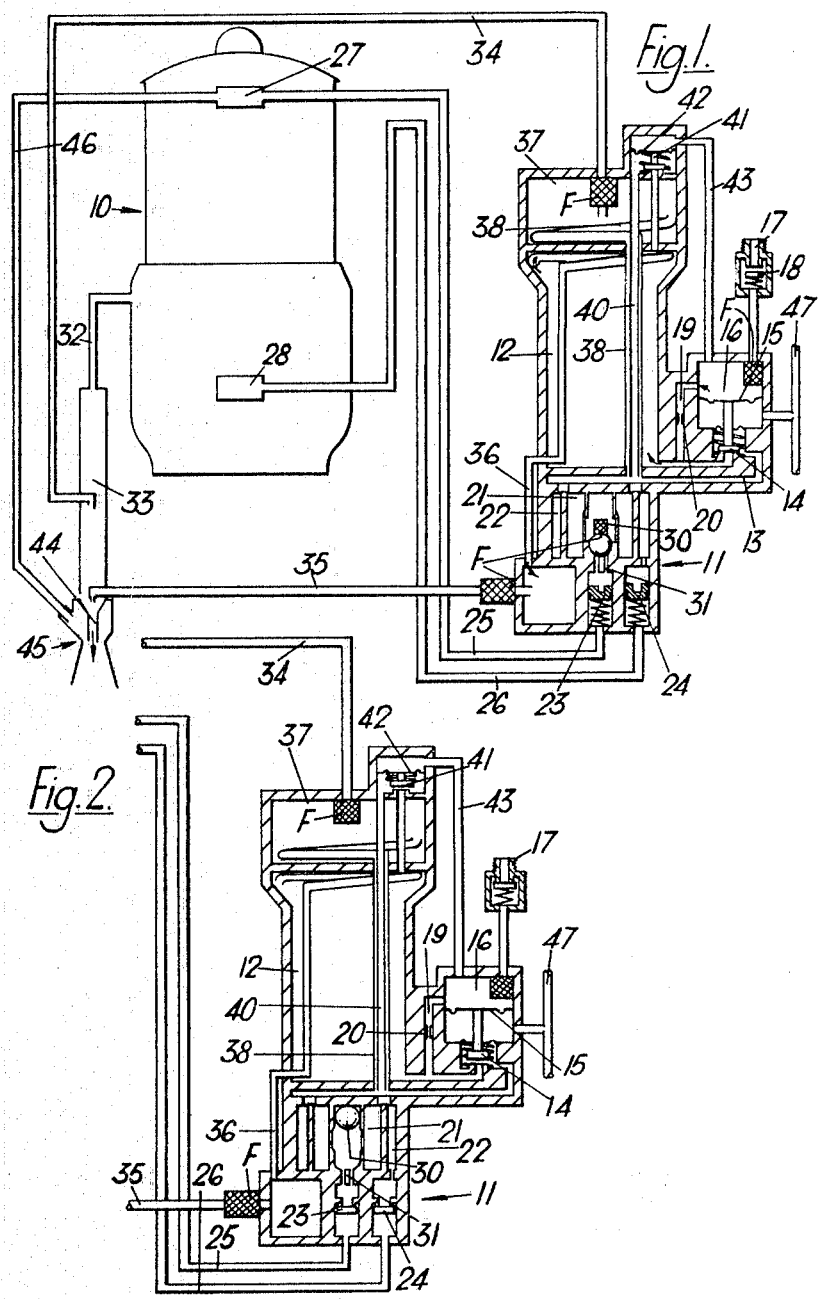

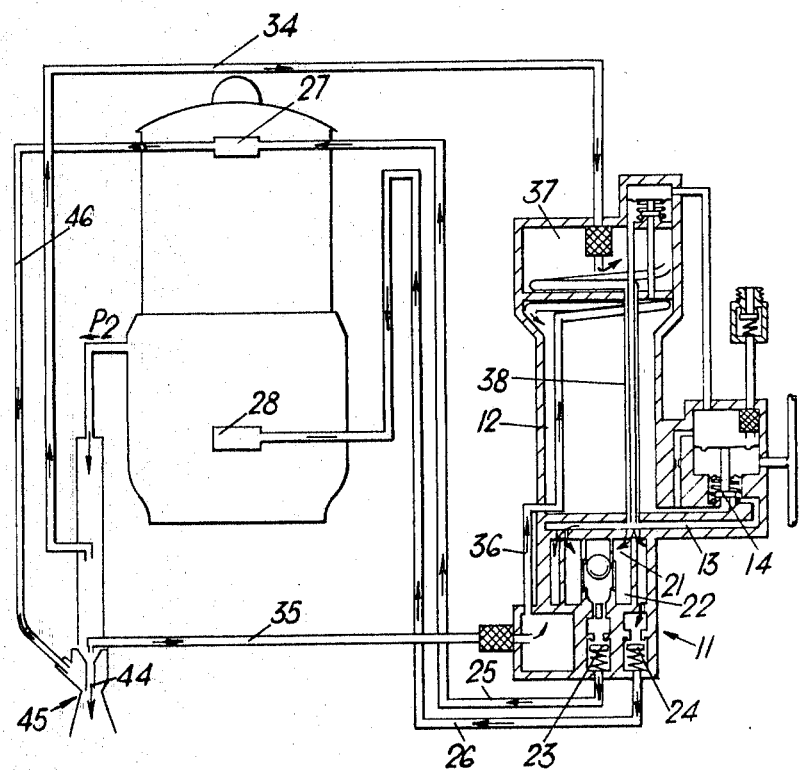

United States Patent Office 3,296,793
Patented Jan. 10, 1967

---

3,296,793
GAS TURBINE LUBRICATION SYSTEMS
David Omri Davies, Kingsway, Derby, Donald Maynard Anley, Hucknall, and Cedric Herbert Briggs, Mickleover, Derby, England, assignors to Rolls-Royce Limited, Derby, Derbyshire, England, a company of Great Britain
Filed July 8, 1966, Ser. No. 563,916
Claims priority, application Great Britain, July 26, 1965, 31,856/65
15 Claims. (Cl. 60—39.08)

This invention comprises improvements in or relating to gas turbine lubrication systems.

According to the invention there is provided means for supplying a single, predetermined quantity of lubricant to a gas turbine engine comprising a lubricant dispensing chamber adapted to be filled from a lubricant reservoir, means operative when the engine is running for supplying compressed air to the surface of the lubricant in the dispensing chamber to force the lubricant from said chamber into the engine, and means, operative when the engine stops for automatically refilling said dispensing chamber from the reservoir.

Preferably the lubricant reservoir is disposed above the dispensing chamber so that lubricant is gravity fed from the reservoir to the dispensing chamber when the engine stops. The lubricant reservoir preferably communicates with the dispensing chamber through valve means, said valve means being closed when the engine is running and opened when the engine stops.

In a preferred embodiment, compressed air is also supplied to the surface of lubricant in the reservoir when the engine is running. Thus the compressed air may be supplied to the lubricant reservoir through a conduit which communicates with the top of the reservoir and which acts as a lubricant overflow during filling thereof.

Preferably the lubricant dispensing chamber comprises a plurality of compartments, each of which communicates through a respective supply conduit with a respective part of the engine to be lubricated. At least one of said compartments may be provided with a valve device which is adapted to seal off the respective supply conduit when the lubricant in the respective compartment has been supplied to the respective part of the engine to prevent air being supplied to the said part.

The invention will be described, by way only of example, with reference to the accompanying drawings, FIGURES 1 to 4, which are simplified sectional views of lubrication means according to the invention illustrating different respective stages of operation thereof.

The construction of the lubrication means will be described with reference to FIGURE 1, the same reference numerals being applied to FIGURES 2 to 4. As illustrated, the lubrication means is provided on a gas turbine direct lift engine, shown diagrammatically and not to scale at 10. The expression "direct lift engine" is understood to mean an engine which is adapted to produce lift forces on an aircraft independently of those produced aerodynamically. The engine 10 illustrated is adapted to be mounted in an aircraft (not shown) with its axis vertical, that is, parallel to the yaw axis of the aircraft, and has a thrust-weight ratio of not less than 8. Such engines are operated only during take-off and landing of the aircraft.

Lubrication of the engine 10 need be effected only so long as the engine is running, and since the periods of operation of the engine are relatively short, it is necessary only to supply a single, predetermined quantity, or "shot," of lubricant to the engine 10 once during each period of operation thereof. For this purpose the lubricant supply means is provided with a lubricant dispensing chamber 11 which is adapted to be gravity-fed with lubricant from a reservoir 12 mounted vertically above the chamber 11 and communicating therewith through a passage 13 including a valve 14. The valve 14 is operated by a diaphragm 15 which is mounted in a supply chamber 16. The supply chamber 16 communicates with a pressure filling connection 17 through a non-return valve 18 and communicates with the reservoir 12 through a filling conduit 19 containing a restrictor 20. The valve 14 is spring-urged towards its open position.

The lubricant dispensing chamber 11 is subdivided into two concentric compartments 21, 22 which communicate through respective non-return valves 23, 24 and conduits 25, 26 with the front bearing 27 and the rear bearing 28 respectively of the gas turbine engine 10. The inner of the compartments, 21, is provided with a valve device comprising a float 30 which co-operates with outlet orifices 31 at the base of the compartment 21 and which, when the lubricant level in the compartment 21 falls below a predetermined level, obturates the orifices 31 and prevents flow of air therethrough.

The engine 10 is provided with a bleed conduit 32 through which a proportion of compressed air is bled from the engine compressor (not shown) in operation of the engine 10. The bleed conduit 32 leads into a compressed air duct 33 with which a first conduit 34 and a second conduit 35 respectively communicate. The first conduit 34 communicates with a chamber 37 disposed immediately above the reservoir 12. An air pipe 38 has an open end in the chamber 37 and passes through the reservoir 12 into the passage 13. The second conduit 35 communicates with a pipe 36 which passes into the reservoir 12 and which has an open end in the interior of the reservoir 12 at the upper end thereof.

A vent pipe 40 also communicates with passage 13, the pipe 40 passing through the reservoir 12 coaxially within the air pipe 38 and communicating with the upper end of the reservoir 12 by way of a venting valve 41. The valve 41 is operated by a diaphragm 42 which is exposed, through a conduit 43, to the pressure of lubricant within the supply chamber 16. The valve 41 is spring-urged towards its open position.

The compressed air duct 33 terminates in a venturi nozzle 44 which forms part of a lubricant scavenge pump 45. The pump 45 is adapted to scavenge lubricant from the front bearing 27 through a scavenge conduit 46.

An atmospheric drain conduit 47 communicates with the side of the diaphragm 15 remote from the supply chamber 16.

Filters are provided where illustrated at F.

In operation the system is first charged with lubricant by connecting a pressurised source of lubricant (not shown) to the pressure filling connection 17. Lubricant passes through the non-return valve 18, the supply chamber 16 and conduit 19 into the reservoir 12. The pressure of the lubricant, applied to the respective diaphragms 15, 42 maintains the respective valves 14, 41 shut (FIGURE 1), when the reservoir 12 is filled, lubricant overflows through the pipe 36 and the second conduit 35 and emerges through the venturi nozzle 44, providing a visual indication that the reservoir 12 is full. This stage of the filling operation is shown in FIGURE 1.

The pressurised source of lubricant is now disconnected. The non-return valve 18 closes and the pressure on the diaphragms 15, 42 falls sufficiently to permit the respective valves 14, 41 to spring open. Lubricant is now fed under gravity from the reservoir 12 into the dispensing chamber 11 through the passage 13, the air displaced from the chamber 11 passing through the vent pipe 40 and venting valve 41 into the air space above the lubricant in the reservoir 12. Both the compartments 21, 22 of the dispensing chamber 11 are now full and the system is thus primed. Subsequent to the filling operation, lubricant drains from the nozzle 44 until the conduit 35 and the pipe 36 are clear (FIGURE 2).

Immediately the engine 10 is started, compressed air from the outlet of the compressor is supplied to the duct 33 through the bleed conduit 32. The compressed air passes through the second conduit 35 and pipe 36 into the space above the lubricant in the reservoir 12, pressurising said lubricant. Compressed air is also supplied through the first conduit 34 to the chamber 37 and thence to the passage 13 through pipe 38. The pressurisation of the lubricant in conduit 43 causes the valve 14 to be closed and at the same time the pressurisation of passage 13 causes the lubricant to be forced from the two compartments 21, 22 through the respective non-return valves 23, 24 and the respective conduits 25, 26 and to be supplied to the front and rear bearings 27, 28 respectively. Compressed air issuing from the nozzle 44 operates the venturi pump 45, causing lubricant to be scavenged from the front bearing 27 through the scavenge conduit 46. This stage of operation of the system is illustrated in FIGURE 3.

The supply of lubricant to the engine 10 continues as shown in FIGURE 3 until predetermined quantities of lubricant, represented by the volumes of the respective compartments 21, 22 have been supplied to the respective bearings 27, 28. Compressed air then passes to the rear bearing 28 through the conduit 26. Compressed air is, however, prevented from entering the front bearing 27 by the float 30 which, when the compartment 21 is empty, obturates the orifices 31, permitting the non-return valve 23 to close (FIGURE 4). No further lubricant is then delivered to the engine 10 until a further period of operation commences.

When the engine 10 stops, the supply of compressed air ceases, and the pressure in the valve 14 is released, enabling the valve 14 to spring open. The dispensing chamber 11 is again filled with lubricant from the reservoir 12, the system automatically reverting to the primed condition shown in FIGURE 2.

We claim:
1. Means for supplying a single, predetermined quantity of lubricant to the bearings of a gas turbine engine comprising a lubricant reservoir, a lubricant dispensing chamber adapted to be filled from said lubricant reservoir, means operative when the engine is running to supply compressed air to the surface of the lubricant in the dispensing chamber to force lubricant from said chamber into the engine, and means operative when the engine stops to refill said dispensing chamber automatically from the reservoir.

2. Means as claimed in claim 1 wherein the lubricant reservoir is disposed above the dispensing chamber so that lubricant is gravity fed from the reservoir to the dispensing chamber when the engine stops.

3. Means as claimed in claim 2 including valve means through which the lubricant reservoir communicates with the dispensing chamber, said valve means being closed when the engine is running and opened when the engine stops.

4. Means as claimed in claim 3 wherein the valve means is spring-urged to its open position but is closed by the pressure of said compressed air.

5. Means as claimed in claim 1 including means supplying compressed air to the surface of the lubricant in the reservoir when the engine is running.

6. Means as claimed in claim 5 including a conduit supplying compressed air to the lubricant reservoir, said conduit communicating with the top of the reservoir and acting as a lubricant overflow during filling thereof.

7. Means as claimed in claim 1 wherein the lubricant reservoir is adapted to be filled with lubricant under pressure.

8. Means as claimed in claim 1 including respective supply conduits connected to respective parts of the engine to be lubricated, wherein the lubricant dispensing chamber comprises a plurality of compartments, each of which communicates through a respective said supply conduit with a respective said part of the engine.

9. Means as claimed in claim 8 including a respective valve device in at least one of said compartments, said valve device being adapted to seal off the respective supply conduit when the lubricant in the respective compartment has been supplied to the respective part of the engine to prevent air being supplied to the said part.

10. Means as claimed in claim 9 wherein each compartment has an outlet communicating with the respective supply conduit, and said valve device comprises an obturating member which floats in the lubricant and which, when the lubricant level in the respective compartment has fallen below a predetermined level, obturates the outlet of said compartment.

11. Means as claimed in claim 2 including a venting valve providing communication between the dispensing chamber and the space above the lubricant in the reservoir, air displaced by lubricant fed into the dispensing chamber from the reservoir being fed to the said space in the reservoir through said venting valve.

12. Means as claimed in claim 1 including a venturi scavenge pump which is driven by said compressed air and which is adapted to withdraw lubricant from the engine when the latter is running.

13. Means as claimed in claim 1 wherein said compressed air is bled from the compressor of the gas turbine engine.

14. Means as claimed in claim 1, said means being adapted to deliver respective single predetermined quantities of lubricant to respective bearings of the gas turbine engine.

15. Means as claimed in claim 3 including a venting valve providing communication between the dispensing chamber and the space above the lubricant in the reservoir, air displaced by lubricant fed into the dispensing chamber from the reservoir being fed to the said space in the reservoir through said venting valve and wherein the venting valve and said valve means are closed by the pressure of lubricant supplied to the reservoir during filling thereof.

References Cited by the Examiner
UNITED STATES PATENTS

| | | |
|---|---|---|
| 2,604,188 | 7/1952 | Marchant _____ 308—187 X |
| 2,761,281 | 9/1956 | Armer _____ 60—39.08 |
| 2,886,133 | 5/1959 | Mauck et al. _____ 60—39.08 X |

CARLTON R. CROYLE, *Primary Examiner.*